United States Patent
Yoshii et al.

(10) Patent No.: US 7,425,886 B2
(45) Date of Patent: Sep. 16, 2008

(54) SMART ENTRY SYSTEM FOR VEHICLE

(75) Inventors: Teruo Yoshii, Hiroshima (JP); Atsushi Okamitsu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 349 days.

(21) Appl. No.: 11/440,037

(22) Filed: May 25, 2006

(65) Prior Publication Data
US 2006/0279401 A1    Dec. 14, 2006

(30) Foreign Application Priority Data

| Jun. 9, 2005 | (JP) | ............................. 2005-169935 |
| Jun. 24, 2005 | (JP) | ............................. 2005-185176 |
| Jun. 24, 2005 | (JP) | ............................. 2005-185180 |

(51) Int. Cl.
| B60R 25/00 | (2006.01) |
| G05B 19/00 | (2006.01) |
| G05B 23/00 | (2006.01) |
| G06F 7/00  | (2006.01) |
| G06F 7/04  | (2006.01) |
| G08B 29/00 | (2006.01) |
| G08C 19/00 | (2006.01) |
| H04B 1/00  | (2006.01) |
| H04B 3/00  | (2006.01) |
| H04Q 1/00  | (2006.01) |
| H04Q 9/00  | (2006.01) |

(52) U.S. Cl. ....................... 340/5.72; 340/5.7; 340/5.61; 340/5.31; 340/5.2

(58) Field of Classification Search ................. 340/5.72, 340/5.7, 5.61, 5.65, 5.8, 5.31, 5.2, 5.1
See application file for complete search history.

(56) References Cited

U.S. PATENT DOCUMENTS

| 4,670,746 | A | * | 6/1987 | Taniguchi et al. .......... 340/5.62 |
| 4,672,375 | A | * | 6/1987 | Mochida et al. ............ 340/5.72 |
| 4,873,530 | A | * | 10/1989 | Takeuchi et al. ............ 343/711 |
| 5,659,291 | A | * | 8/1997 | Kennedy et al. ............ 340/457 |
| 5,969,597 | A | * | 10/1999 | Weigl et al. ................ 340/5.61 |
| 6,191,703 | B1 |   | 2/2001 | Wallace |
| 6,386,447 | B1 | * | 5/2002 | Proefke et al. .............. 235/380 |
| 6,906,612 | B2 | * | 6/2005 | Ghabra et al. .............. 340/5.61 |
| 2003/0014164 | A1 | * | 1/2003 | Shin .............................. 701/2 |
| 2006/0028353 | A1 |   | 2/2006 | Mueller et al. |

FOREIGN PATENT DOCUMENTS

| DE | 10355605 | 6/2005 |
| EP | 1619094 | 1/2006 |
| JP | 2002070626 | 3/2002 |

OTHER PUBLICATIONS

European Search Report, EP 06009654, Aug. 3, 2006.

* cited by examiner

*Primary Examiner*—George A Bugg
*Assistant Examiner*—Travis R Hunnings
(74) *Attorney, Agent, or Firm*—Studebaker & Brackett PC; Donald R. Studebaker

(57) ABSTRACT

Even if there is the ID verification confirmation of the ID signal that is transmitted in response to the request signal of the vehicle-inside transmitting antenna at the lock of the doors, the disablement of the ID code of the transmitter located inside the vehicle that has been registered at the memory is prohibited when at least one of operations of the lock switch of the transmitter that is located outside or inside the vehicle and the vehicle-inside switches is detected. Accordingly, the passenger inside the vehicle can start the engine by using the transmitter left behind in the vehicle.

15 Claims, 8 Drawing Sheets

SMART ENTRY SYSTEM FOR VEHICLE

BACKGROUND OF THE INVENTION

The present invention relates to a smart entry system for a vehicle.

A smart entry (R) system is known, in which a door unlock or an engine start of a vehicle is granted when verification of an ID (identification) code contained in an ID (identification) signal, which is transmitted by a portable device and received by an onboard device at the vehicle, is confirmed.

Specifically, in the above-described smart entry (R) system, as disclosed in US Patent Application Publication No. 2003/0014164 A1, when an operation of the door unlock is conducted by a passenger from outside the vehicle, the request signal is transmitted outside the vehicle by the onboard device. Herein, the ID signal containing ID code is transmitted in response to the request signal, and then the ID verification is conducted by the smart keyless (R) control unit of the onboard device that has received the ID signal. When the ID verification is confirmed, namely, when the ID code contained in the ID signal matches an ID code that is registered at the smart keyless (R) control unit, the control unit outputs a signal for granting the door unlock, so the door is unlocked.

In the above-described smart entry (R) system, likewise, the ID verification is also conducted when an operation of engine start is conducted by the passenger, and when the ID verifications is confirmed, the control unit outputs a signal for granting the engine start, so the engine is started.

Further, the above-described smart entry (R) system is configured to disable the ID code of the portable that has been mistakenly left in the vehicle when the door is locked, or to cancel this disablement of the ID code in case the above-described ID verification is confirmed when the door unlock operation is conducted from outside the vehicle.

More specifically, in the above-described smart entry (R) system, when the door lock operation is conducted, the request signal is transmitted inside the vehicle by the onboard device. Then, the portable device transmits the ID signal in response to the request signal, and then the ID verification is conducted by the smart keyless (R) control unit of the onboard device that has received the ID signal. When the ID verification is confirmed, it is considered that the portable device has been left behind mistakenly, and thus this situation is notified of with an alarm and the ID code of the portable device left behind is disabled. Thereby, the engine start with the operation of the portable device is prohibited. Also, in the above-described smart entry (R) system, when the door unlock operation is conducted after this disablement operation, the disablement of the ID code of the portable device is cancelled in case the above-described ID verification is confirmed. Thereby, the engine start is granted again when the ID code verification with the portable device is confirmed.

However, if the ID code is always disabled as described above when the ID verification is confirmed, any passenger who is present in the vehicle could not use the portable device, whose ID code has been disabled, to start the engine, so utility or facility of the smart entry (R) system would deteriorate.

Also, in the case where the portable device is left behind in the vehicle, even if the ID code of the portable device is disabled as described above, the portable device generally comprises a transponder and a key, and therefore there is a concern that an unauthorized person (thief) who gets in the vehicle could start the engine with the key of the portable device left behind and thereby the vehicle could be stolen.

Further, if the disablement of the ID code of the portable device is cancelled as described above, there is a similar concern that any unauthorized person (thief) could start the engine with the portable device whose ID code has become available and thereby the vehicle could be stolen.

SUMMARY OF THE INVENTION

The present invention has been devised in view of the above-described problems, and an object of the present invention is to provide a smart entry system for a vehicle in which the door unlock and the engine start are granted when the ID verification is confirmed, that can improve the utility or facility, or the security by preventing the vehicle from being stolen.

According to the present invention, there is provided a smart entry system for a vehicle, comprising an onboard transmitter operative to transmit a request signal, a portable device operative to transmit an ID signal when receiving the request signal from the onboard transmitter, an onboard receiver operative to receive the ID signal from the portable device, a door control device operative to unlock a door when ID verification is confirmed, the ID verification being conducted based on the ID signal received by the onboard receiver that is transmitted by the portable device in response to the request signal that is transmitted outside the vehicle by the onboard transmitter at least when an unlock operation of the door from outside the vehicle is detected, an engine control device operative to start an engine of the vehicle when ID verification is confirmed, the ID verification being conducted based on the ID signal received by the onboard receiver that is transmitted by the portable device in response to the request signal that is transmitted inside the vehicle by the onboard transmitter when an engine start switch is operated, and a disablement control device operative to disable the ID verification with the portable device at the operation of the engine start switch when ID verification is confirmed, the ID verification being conducted based on the ID signal received by the onboard receiver that is transmitted by the portable device in response to the request signal that is transmitted inside the vehicle by the onboard transmitter when the door is locked, wherein the disablement control device is configured to prohibit or cancel the disablement of the ID verification with the portable device in a specified state.

Herein, the above-described "to disable the ID verification with the portable device at the operation of the engine start switch when ID verification is confirmed" means disablement that is done, for example, by prohibiting the engine start regardless of the ID verification, making the ID invalid, disabling the portable device, or missing conducting the ID verification.

According to the present invention, there is provided the disablement control device operative to disable the ID verification with the portable device at the operation of the engine start switch when ID verification is confirmed, and this disablement control device is configured to prohibit or cancel the disablement of the ID verification with the portable device in the specified state. Thereby, since the disablement of the ID verification with the portable device is prohibited or cancelled in a certain state at need, any problems that would be caused by the disablement of the ID verification can be prevented.

More specifically, the disablement control device prohibits the disablement of the ID verification with the portable device when it is determined that a passenger is present in the vehicle. Namely, when it is determined that a passenger is present in the vehicle, even if the portable device is located in the vehicle (for example, when the portable device is left behind in the vehicle, or when the passenger remaining in the vehicle has the portable device), the ID verification with the portable device located in the vehicle is not disabled. Accordingly, the passenger remaining in the vehicle can operate the engine start with the portable device. Thereby, the proper utility or facility of the smart entry (R) system for a vehicle can be obtained.

According to another embodiment of the present invention, the disablement control device prohibits the disablement of the ID verification with the portable device when it is determined that a specified operation to show that the passenger is present in the vehicle is conducted. Thereby, a preferred embodiment of the present invention can be provided.

According to another embodiment of the present invention, the above-described specified operation comprises at least one of operations of a specified switch located in the vehicle, the portable device located in the vehicle, and the portable device located outside the vehicle.

Namely, when it is determined that the specified switch located in the vehicle is operated by the passenger remaining in the vehicle, the portable device located in the vehicle is operated in the vehicle, or the portable device located outside the vehicle is operated by the passenger located outside the vehicle, the ID verification with the portable device located in the vehicle is not disabled even if the portable device is present in the vehicle. Accordingly, the ID verification with the portable device located in the vehicle is not disabled at need when the above-described operations are conducted by the passenger. Thus, since the disablement of the ID verification with the portable device located in the vehicle is restricted properly, it can be prevented that any unauthorized person (thief) starts the engine with the portable device located in the vehicle and steel the vehicle. Thereby, the proper utility or facility of the smart entry (R) system for a vehicle can be obtained.

According to another embodiment of the present invention, the disablement control device is configured to further conduct an alarm when the ID verification is confirmed and to prohibit the disablement of the ID verification with the portable device when it is determined that the above-described specified operation is conducted within a specified period of time after the alarm.

Herein, the above-described "a specified period of time" means time that is long enough to make the above-described specified operation complete.

According to the above-described embodiment, since the alarm is conducted when the ID verification is confirmed, the passenger can know that the portable device is present in the vehicle.

Further, since the ID verification with the portable device is not disabled when it is determined that the above-described specified operation is conducted within the specified period of time after the alarm, the disablement of the ID verification with the portable device located in the vehicle can be restricted more properly, so it can be prevented more properly that any unauthorized person (thief) starts the engine with the portable device located in the vehicle and steel the vehicle. Thereby, the proper utility or facility of the smart entry (R) system for a vehicle can be improved.

According to another embodiment of the present invention, the disablement control device is configured to cancel the disablement of the ID verification with the portable device in the specified state. More specifically, the disablement control device cancels the disablement of the ID verification with the portable device (first portable device) when ID verification is confirmed, the ID verification being conducted based on an ID signal received by the onboard receiver that is transmitted by a portable device (second portable device) other than the portable device (first portable device) in response to the request signal that is transmitted inside the vehicle by the onboard transmitter after the door is unlocked.

Herein, the above-described "after the door is unlocked" also includes "at the time the door is opened or after the timing of the door opened after the door is unlocked."

According to this embodiment, when the door lock operation is conducted, the request signal is transmitted inside the vehicle by the onboard device. Then, the portable device (first portable device) transmits the ID signal in response to the request signal, and then the ID verification is conducted. When the ID verification is confirmed, it is considered that the (first) portable device has been left behind mistakenly, and thus the ID code of the (first) portable device left behind is disabled after this by the disablement control device. And, after the door is unlocked, the request signal is transmitted inside the vehicle by the onboard device, and another portable device (second portable device) transmits the ID signal in response to the request signal. Then, the ID verification is conducted based on this ID signal. When this ID verification is confirmed, it is considered that this (second) portable device, namely, a passenger carrying this (second) portable device is present in the vehicle, and thus the disablement of the ID verification with the above-described (first) portable device is cancelled. Accordingly, since the disablement of the ID verification with the portable device left behind is cancelled after it has been determined that the passenger carrying the another portable device is present in the vehicle, any unauthorized person (thief) can be prevented from getting in the vehicle and starting the vehicle by using the portable device left behind in the vehicle to steel the vehicle. Thereby, the security of the smart entry system can be improved.

According to another embodiment of the present invention, the disablement control device is configured to notify a passenger of the above-described cancellation of the disablement of the ID verification.

Thereby, since the passenger can recognize the above-described cancellation of the disablement of the ID verification with the portable device left behind in the vehicle, the situation where the passenger leaves the vehicle with the portable device left behind in the vehicle without the door lock (herein, "without door lock" means a situation where the ID verification would not be disabled) can be properly prevented. Accordingly, any unauthorized person (thief) can be prevented from getting in the vehicle and starting the vehicle by using the portable device left behind in the vehicle to steel the vehicle. Thereby, the security of the smart entry system can be further improved.

According to another embodiment of the present invention, the above-described request signal for the ID verification is periodically transmitted inside the vehicle by the onboard transmitter prior to the engine start after the door is unlocked.

Thereby, the passenger can know the above-described cancellation of the disablement of the ID verification with the portable device left behind prior the engine start. Generally, after the engine has started, the passenger (driver) would have relatively busy time and some noises (engine noise) would distract the passenger' attention. According to the above-described embodiment, however, since the notification of the cancellation of the disablement of the ID verification is conducted to the passenger prior the engine start, the passenger can surely recognize the situation of the cancellation surely and deal with it properly with time on hand. Thus, the utility or facility of the smart entry system can be improved.

According to another embodiment of the present invention, the above-described disablement control device is configured such that when the portable device (first portable device) is not located in the vehicle, the disablement of the ID verification with the portable device (first portable device) that is not located in the vehicle is not cancelled.

Accordingly, even if the ID verification with the portable device (second portable device) is confirmed, when the portable device (first portable device) is not located in the vehicle (for example, when any person other than an user of the vehicle (thief) takes the portable device left behind out of the vehicle), at least the disablement of the ID verification with the portable device (first portable device) that is not located in the vehicle is not cancelled. Thus, even if the passenger carrying another portable device other than the portable device (first portable device) that has been left behind in the vehicle is present in the vehicle, when the portable device left behind is taken out of the vehicle, the disablement of the ID verification with the portable device (first portable device) is not cancelled. Thereby, a situation, where any person other than the vehicle's user could take the portable device left behind out of the vehicle once and then again get in the vehicle with the portable device and steal the vehicle using the portable device carried into the vehicle (after the disablement of the ID verification has been cancelled), can be avoided. Thus, the security of the smart entry system can be further improved.

According to another embodiment of the present invention, the smart entry system for a vehicle further comprises a transponder and a key that are provided at said portable device, an onboard reading device operative to read ID of the transponder, and a memory device operative to memorize ID of the portable device and ID of the transponder, wherein the confirmation of the ID verification at the door control device to unlock the door is accomplished when it is determined that ID of the ID signal transmitted by the portable device matches the ID of the portable device that is memorized at the memory device, the confirmation of the ID verification at the engine control device to start the engine is accomplished when it is determined that the ID of the ID signal transmitted by the portable device matches the ID of the portable device that is memorized at the memory device or when it is determined that the ID of the transponder that is read by the onboard reading device matches the ID of the transponder that is memorized at the memory device, the confirmation of the ID verification at the disablement control device to disable the ID verification with the portable device is accomplished when it is determined that the ID of the ID signal transmitted by the portable device matches the ID of the portable device that is memorized at the memory device, the memory device is configured to memorize the ID of the portable device and the ID of the transponder in such a manner that both ID are associated with each other, and the disablement control device is configured to disable the ID verification with the transponder at an operation of the engine start by the key when ID verification is confirmed.

Herein, the above-described "to disable the ID verification with the transponder at operation of the engine start by the key when ID verification is confirmed" means disablement that is done, for example, by prohibiting the engine start regardless of the ID verification, making the ID invalid, disabling the transponder, or missing conducting the ID verification.

According to the above-described embodiment, the ID verification with the portable device is disabled by the disablement control device when the confirmation of the ID verification is accomplished, namely, when it is determined that the ID of the ID signal transmitted by the portable device matches the ID of the portable device that is memorized at the memory device, and the ID verification with the transponder at the operation of the engine start by the key is also disabled when the ID verification is confirmed. Thereby, any person (thief) other than the vehicle' user who gets in the vehicle can not start the engine by using the portable device or the key, so the vehicle can not be stolen. Thus, the security of the smart entry system can be improved.

Generally, the transponder is not operated by a battery, which is different from the portable device, and therefore it may not have a problem of the battery going dead. Also, the transponder is configured to transmit its own ID (identification signal) that is particular to it when it is inserted into the onboard reading device. Accordingly, the onboard reading device can receive the ID of the transponder only when the transponder is located very close to the onboard device (for example, within 15 cm). Herein, in case the portable device with the transponder is left behind in the vehicle, the portable device may not be located very close to the onboard reading device, so the ID verification with the transponder can not be disabled by the onboard reading device. Therefore, the inventors of the present invention has devised an idea according to the above-described embodiment.

According to another embodiment of the present invention, the portable device comprises a portable-device-side reading device operative to read the ID of the transponder and to transmit the ID of the transponder that is read by the portable-device-side reading device at least when receiving the request signal at the door lock along with the ID signal, the onboard receiver is configured to receive the ID of the transponder along with the ID signal, and the disablement control device is configured to make the memory device memorize the ID of the transponder that is received by the onboard receiver and the ID of the portable device in such a manner that both ID are associated with each other.

Thereby, the portable device transmits the ID of the transponder that is read by the portable-device-side reading device along with its ID signal at least when receiving the request signal at the door lock. Then, the onboard receiver receives the ID of the transponder along with the ID signal from the portable device. The received ID of the transponder is memorized at the memory device in such a manner that it is associated with the ID of the portable device. Thus, even in case the ID of the transponder that is associated with the ID of the portable device has not been memorized at the memory device, the ID of the transponder corresponding to the ID of the portable device can be easily memorized at the memory device by memorizing the ID of the transponder from the portable device that is received by the onboard receiver.

According to another embodiment of the present invention, the disablement control device is configured to provide guidance for prompting a passenger to make the onboard reading device read the ID of the transponder when the ID of the transponder corresponding to the ID of the portable device is not memorized at the memory device in case the portable device is present in the vehicle, and to make the memory device memorize the ID of the transponder that is read by the onboard reading device after the guidance in such a manner that both ID are associated with each other.

Thereby, when the ID of the transponder corresponding to the ID of the portable device is not memorized at the memory device in case the portable device is present in the vehicle, the guidance for prompting the passenger to make the onboard reading device read the ID of the transponder is provided. And, the memory device memorizes the ID of the transponder that is read by the onboard reading device after the guidance in such a manner that both ID are associated with each other. Thus, even in case the ID of the transponder that is associated with the ID of the portable device has not been memorized at the memory device, the ID of the transponder corresponding to the ID of the portable device can be easily memorized at the memory device, by making the onboard reading device read the ID of the transponder with the guidance and memorizing the ID of the transponder from the portable device that is received by the onboard receiver.

According to another embodiment of the present invention, the disablement control device is configured such that the above-described guidance is not provided when a plurality of portable devices including the portable device are present in the vehicle.

In case the ID of the transponder corresponding to the ID of the portable device is not memorized at the memory device with a plurality of portable devices including the portable device present in the vehicle, it is not apparent which portable device has no ID of the transponder memorized at the memory device. In this case, providing the guidance might cause a problem that the passenger makes the onboard reading device read the ID of the wrong transponder. As a consequence, the ID of the wrong transponder might be memorized at the memory device.

Herein, according to the above-described embodiment, the guidance is not provided when a plurality of portable devices including the portable device are present in the vehicle even if the ID of the transponder corresponding to the ID of the portable device is not memorized at the memory device. Thereby, a situation where the ID of the wrong transponder might be memorized at the memory device can be avoided properly.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Figure 1:
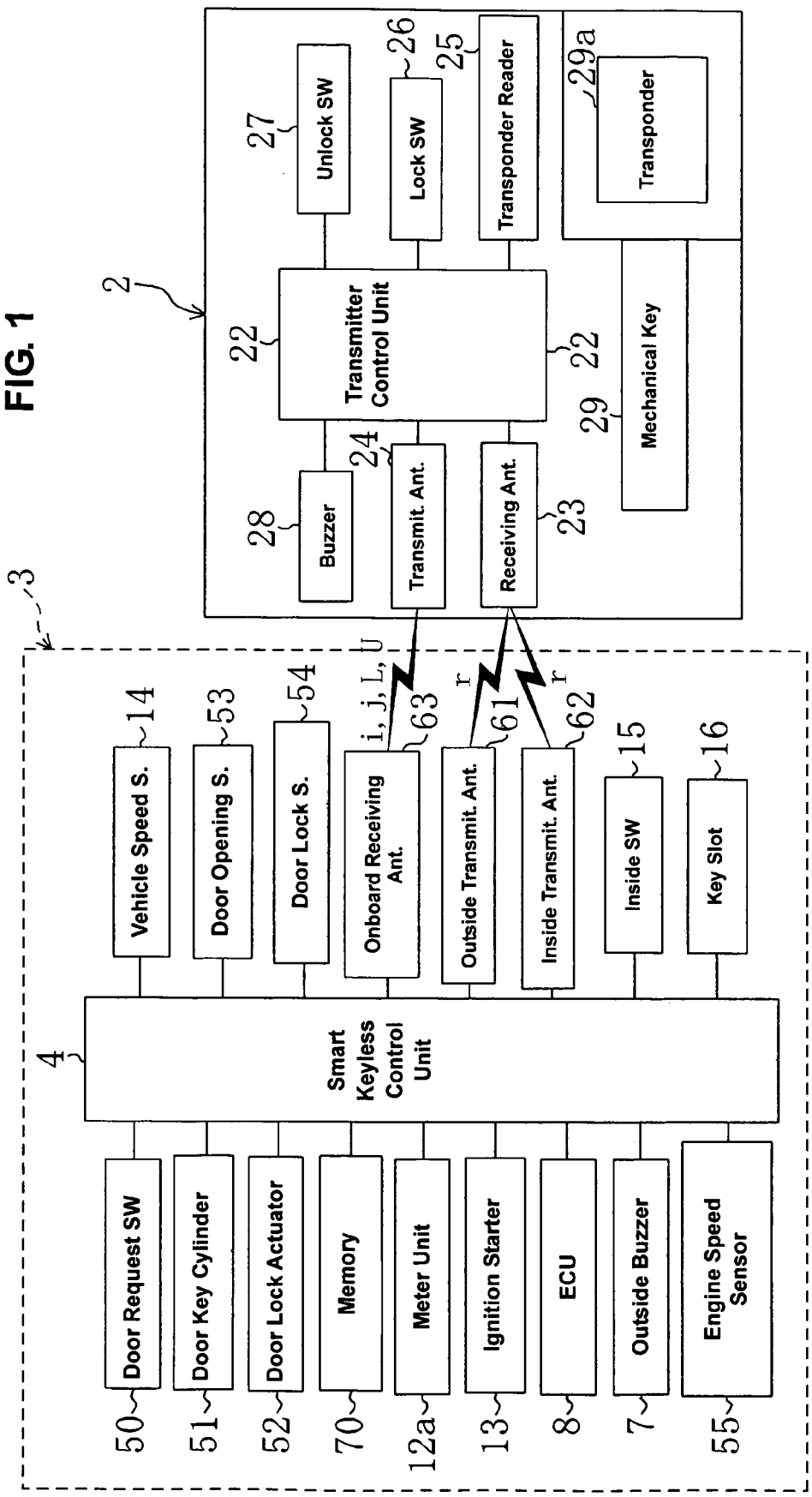
FIG. 1 is a block diagram of a smart keyless (R) system for a vehicle according to an embodiment of the present invention.
Figure 2:
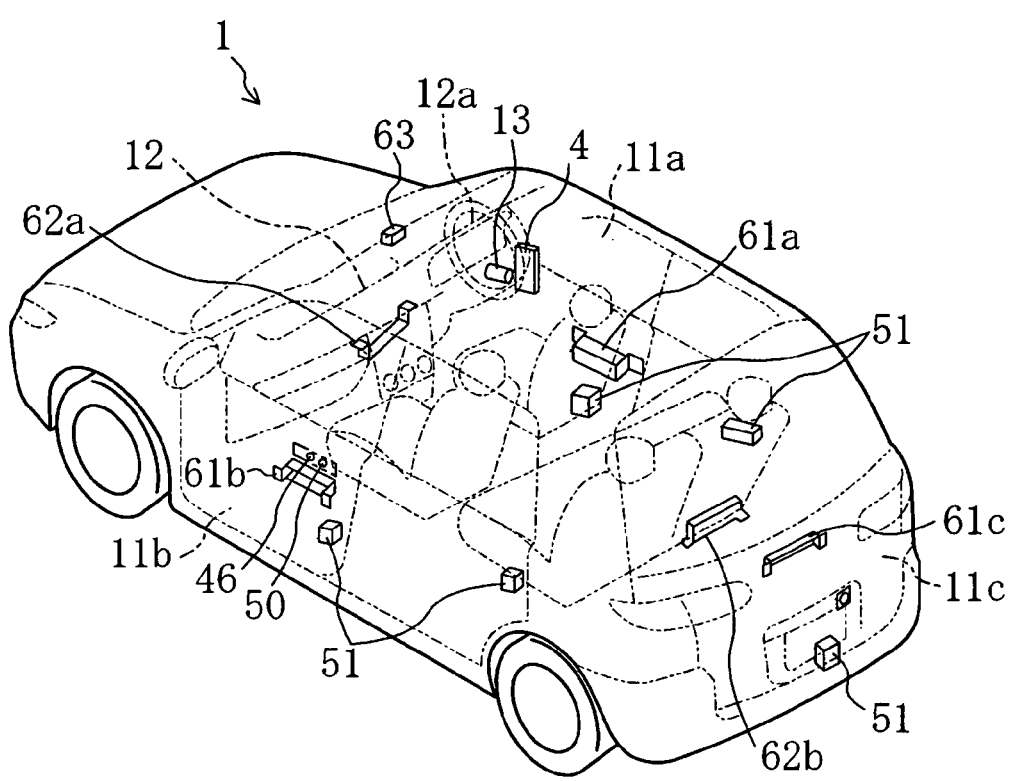
FIG. 2 is a perspective view of a vehicle equipped with an onboard device.

FIG. 1 shows an entire constitution of a smart keyless (R) system for a vehicle according to an embodiment of the present invention. The system comprises a plurality of transmitters 2, . . . (only one illustrated) as a portable device carried by a passenger, and an onboard 3 that is provided at a vehicle 1. FIG. 2 is a schematic diagram of the vehicle 1 equipped with the onboard device 3. In FIG. 2, the vehicle 1 has a driver's-seat-side door 11a on the right of the vehicle and an assistant's-seat-side door 11b on the left of it. The vehicle 1 also has a meter unit 12a at a front-side-located instrument panel 12 on the driver's seat side. Herein, the present embodiment shows a type of vehicle in which a vehicle trunk is located inside the vehicle as well as a passenger compartment.

Each of the transmitters 2 includes a transmitter control unit 22 comprising CPU. To the transmitter control unit 22 are operationally connected a receiving antenna 23 to receive a request signal r from the onboard device 3, a transmitting antenna 24 to transmit a transmitter ID signal i containing an ID code of the transmitter 2, a transponder ID signal j containing an ID code of a transponder 29a of a mechanical key 29 and a door lock/unlock signals L, U, for locking or unlocking the door, a transponder reader 25 (portable-device-side reading device) to read the ID code of the transponder 29a installed in the mechanical key 29 of the transmitter 2, a lock switch 26 for the door lock, an unlock switch 27 for the door unlock, a buzzer 28 as an alarm for warning the passenger carrying the transmitter 2. When the receiving antenna 23 receives the request signal r from the onboard device 3, the transmitter control unit 22 makes the transmitting antenna 24 transmit the transmitter ID signal i containing the ID code of the transmitter 2 and the transponder ID signal j containing the ID code of the transponder 29a that has been read by the transponder reader 25. When the lock switch 26 or unlock switch 27 are operated by pushing, the transmitter control unit 22 makes the transmitting antenna 24 transmit the lock or unlock signals L, U and the transmitter ID signal i.

In the transmitter 2 is detachably installed the mechanical key 29 as an emergency key to conduct the door lock, door unlock or engine start in case a battery (not illustrated) of the transmitter 2 is dead or the above-described smart keyless (R) system does not work. In the mechanical key 29 is installed the transponder 29a having an internal antenna (not illustrated) and IC (not illustrated) to memorize the ID code.

The onboard device 3 comprises a smart keyless (R) control unit 4 with CPU, as a control device. To the smart keyless (R) control unit 4 are operationally connected the meter unit 12a provided at the upper portion of the instrument panel 12 located before the driver's seat, an ignition starter 13, as an engine start switch of the vehicle 1, provided below the meter unit 12a, a vehicle speed detecting sensor 14 to detect the vehicle speed, switches 15, . . . located in the vehicle to operate respective devices in the vehicle 1 (such as power windows, audio devices, etc.), a key slot as the transponder reader (onboard reading device) that is provided before the driver's seat and in which the mechanical key 29 is inserted, door request switches 50, 50 provided at door knobs of the respective doors 11a, 11b, door key cylinders 51, 51 provided at the door knobs of the respective doors 11a, 11b for receiving the mechanical key 29. Further, to the smart keyless (R) control unit 4 are operationally connected door lock actuators 52, 52 provided at the respective doors 11a, 11b for locking/unlocking the doors 11a, 11b, door opening detecting sensors 53, 53 to detect opening state of the respective doors 11a, 11b, door lock detecting sensors 54, 54 to detect lock/unlock state of the respective doors 11a, 11b, an engine speed detecting sensor 55 to detect the engine speed, vehicle-outside/vehicle-inside transmitting antennas 61, 62 as an onboard transmitter to transmit the request signal r to the transmitter 2, an onboard receiving antenna 63 as an onboard receiver that is provided above the instrument panel 12, a memory 70 to memorize the ID code of the transmitter 2, the ID code of the transponder 29a and information on validity of these ID code, a buzzer 7 to alarm outside the vehicle, and an ECU (engine control unit) 8.

The above-described meter unit 12a comprises an alarm lamp and an alarm buzzer (not illustrated) to conduct alarm to the passenger in the vehicle, a key-knob-unlock indication unit (not illustrated) to indicate an unlock state of a key knob (not illustrated) of the ignition starter 13, and a transponder-ID-registration indication unit (not illustrated) to prompt to register the ID code of the transponder 29a at the memory 70.

The ignition starter 13 takes its four positions of accessory OFF, accessory ON, ignition ON, ignition START by the rotation of the key knob. These selected position signals are fed to the smart keyless (R) control unit 4.

The switches 15 located in the vehicle are operated and their operational signals are fed to the smart keyless (R) control unit 4.

A coil antenna (not illustrated) is provided above the above-described key slot 16. The coil antenna receives the transponder ID signal j from the transponder 29a of the mechanical key 29 inserted into the key slot 16, and supplies the received transponder ID signal j to the smart keyless (R) control unit 4. Thus, the key slot 16 reads the ID code of the transponder 29a of the mechanical key 29 inserted thereinto and supplies the read ID code to the smart keyless (R) control unit 4.

The door request switches 50 are provided at the respective door knobs of the doors 11a, 11b so as to be operated from outside the vehicle, and these switches are used for indication of intention to lock or unlock the doors. The door request switches 50 are operated by pushing and their operational signals as an ON signal are supplied to the smart keyless (R) control unit 4. The smart keyless (R) control unit 4 detects the door lock/unlock operations conducted from outside the vehicle based on these signal supplied thereto.

The door lock actuators 52 lock or unlock the doors 11a, 11b in response to the door lock or unlock signals from the smart keyless (R) control unit 4.

The door opening detecting sensors 53 are sensors to detect whether the respective doors 11a, 11b are opened or closed, and when the door 11a (or 11b) is opened, they supply a door opening signal to the smart keyless (R) control unit 4.

The vehicle-outside transmitting antenna 61 comprises a driver's-seat-side transmitting antenna 61a, assistant's-seat-side transmitting antenna 61b and a rear-end-panel transmitting antenna 61c that are respectively provided at the driver's seat, assistant's seat and a rear end panel 11c of the vehicle. The vehicle-inside transmitting antenna 62 comprises a front transmitting antenna 62a and a rear transmitting antenna 62b that are respectively located at the front portion before the instrument panel 12 and at the rear portion behind a rear seat.

The above-described transmitting antennas 61a-61c, 62a, 62b transmit the request signals respectively with a substantially sphere transmission area, whose transmission areas are overlapped partially. The request signals are transmitted in order of the transmitting antennas 61a-61c, 62a and 62b.

The onboard receiving antenna 63 receives the transmitter ID signal i, the transponder ID signal j and the door lock/unlock signals L, U, and supplies these signals to the smart keyless (R) control unit 4.

And, the location of the transmitter 2 that is present now in the vehicle or outside the vehicle can be determined by the above-described arrangement of the transmitting antennas 61a-61c, 62a and 62b. Namely, when the onboard receiving antenna 63 receives the transmitter ID signal i that the transmitter 2 transmits in response to only the request signal r from the vehicle-outside transmitting antenna 61, it can be determined that the transmitter 2 is present outside the vehicle near the driver's-seat-side door 11a, the assistant's-seat-side door 11b or the rear end panel 11c. Meanwhile, when the onboard receiving antenna 63 receives the transmitter ID signal i that the transmitter 2 transmits in response to only the request signal r from the vehicle-inside transmitting antenna 62, it can be determined that the transmitter 2 is present in the vehicle.

The memory 70 registers the ID codes of the respective transmitters 2 in advance, and the ID codes of the transponders 29a of the transmitters 2 are memorized to be associated with the ID codes of the respective transmitters 2. Further, at the memory 70 is memorized information as to whether these ID codes of the transmitters 2 and the transponders 29a are valid or invalid.

Next, the processing at the smart keyless (R) control unit 4 of the onboard device 3 will be described.

First, the door lock control by the above-described smart keyless (R) system for a vehicle will be described. Herein, this door lock control is to unlock/lock the doors 11a, 11b without the insertion operation of the mechanical key 29 of the transmitter 2 into the door key cylinder 51.

When the passenger carrying the transmitter 2 pushes the door request switch 50 at the engine stop of the vehicle 1, the vehicle-outside/vehicle-inside transmitting antennas 61, 62 transmit the request signals r, r. The transmitter 2 transmits the transmitter ID signal i in response to the request signals r, r from the antennas 61, 62. The onboard receiving antenna 63 receives the transmitter ID signal i, and the verification of the ID code contained in the transmitter ID signal i is conducted. Herein, when the transmitter ID signal i is transmitted in response to only the request signal r from the vehicle-outside transmitting antenna 61 and the ID code verification based on the signal is confirmed, it can be determined that the passenger with the transmitter 2 is present outside the vehicle near the driver's-seat-side door 11a or the assistant's-seat-side door 11b. Thus, the unlock/lock control of the doors 11a, 11b are conducted according to the lock/unlock state of the doors 11a, 11b. This lock/unlock state of the doors 11a, 11b is detected by the above-described door lock detecting sensors 54, respectively. And, the conduct of the unlock/lock control of the doors 11a, 11b are executed by the respective door lock actuators 52 to which the door unlock/lock command signals are supplied from the control unit 4, whose details will be described below.

Herein, the door lock or door unlock may be attained by the mechanical key 29 inserted into the door key cylinder 51 or by a remote control of the door lock actuators 52 that is actuated by pushing the lock/unlock switches 26, 27 of the transmitter 2. Specifically, for example, when the lock switch 25 is pushed, the transmitting antenna 22 transmits the lock signal L and the transmitter ID signal i, and then the ID code verification of the transmitter 2 is conducted by the control unit 40 of the onboard device 4 that has received the signal i. When the verification is confirmed, the door lock signal is fed to the door lock actuator 52 and thereby the door is locked.

Subsequently, the disablement control by the smart keyless (R) system for a vehicle will be described. This disablement control is to disable the ID code of the transmitter 2 left behind in the vehicle or the like at the door lock state of the doors 11a, 11b.

Figure 3A:
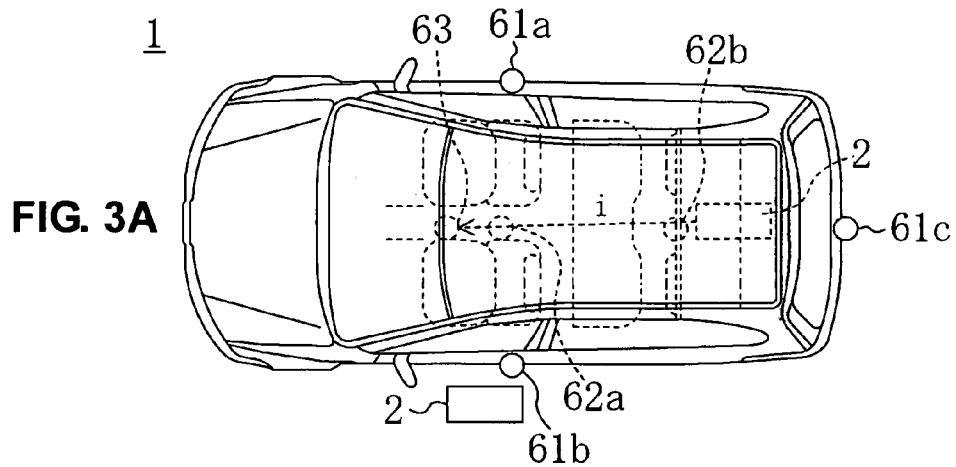
FIG. 3A, 3B are plan views of the vehicle equipped with the onboard device in a state of disablement control.
Figure 3B:
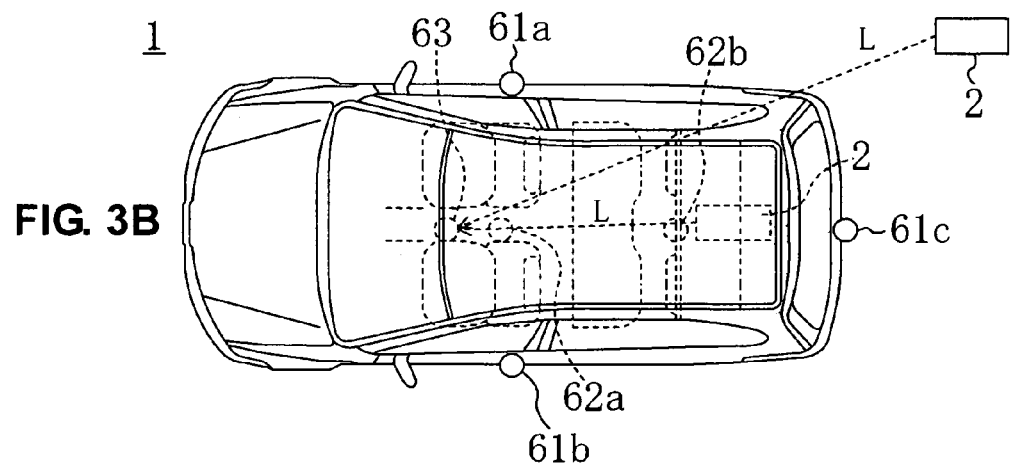

When the doors 11a, 11b are locked, the vehicle-inside transmitting antenna 62 transmits the request signal r. The transmitter 2 transmits the transmitter ID signal i in response to the request signal r from the transmitting antenna 62. The onboard receiving antenna 63 receives the transmitter ID signal i, and the verification of the ID code contained in the transmitter ID signal i is conducted. Herein, when the transmitter ID signal i of the transmitter 2 (the second portable device) is transmitted in response to the request signal r from the vehicle-inside transmitting antenna 62 and the ID code verification based on the signal is confirmed, as shown in FIG. 3A, it is determined that the transmitter 2 is left behind in the vehicle. Thus, the alarm is conducted with the lamp and the inside/outside buzzers, and the ID code of the transmitter 2 left behind and the ID code of the transponder 29a corresponding to this ID code of the transmitter 2 are disabled. Herein, the broken lines with arrows in the figure show flows of the signals from the transmitter 2 to the onboard device 3. After this disablement, the engine is not started by the rotating operation of the ignition starter 13 to the START position even if the ID code verification with this transmitter 2 is confirmed. Meanwhile, even in the case where the transmitter ID signal i is transmitted in response to the request signal r from the vehicle-inside transmitting antenna 62 and the ID code verification based on the signal is confirmed, namely even in the case where it is determined that the transmitter 2 is left behind in the vehicle, as shown in FIG. 3B, the ID codes of the transmitter 2 present in the vehicle (carried by the passenger still left behind in the vehicle) and the transponder 29a corresponding to the ID code of the transmitter 2, which have been registered at the memory 70, are not disabled when at least one of the operational signals of the lock switch 26 of the vehicle-inside or vehicle-outside transmitter 2 and the switches 15 is detected. Details will be described below. A "specified operation" in the present invention corresponds to at least one of the operational signals of the lock switch 26 of the vehicle-inside or vehicle-outside transmitter 2 and the switches 15.

Next, the disablement cancellation control by the smart keyless (R) system for a vehicle will be described. This disablement cancellation control is to cancel the disablement of the ID code of the transmitter 2 left behind in the vehicle or the like at the door unlock state of the doors 11a, 11b.

Figure 3C:
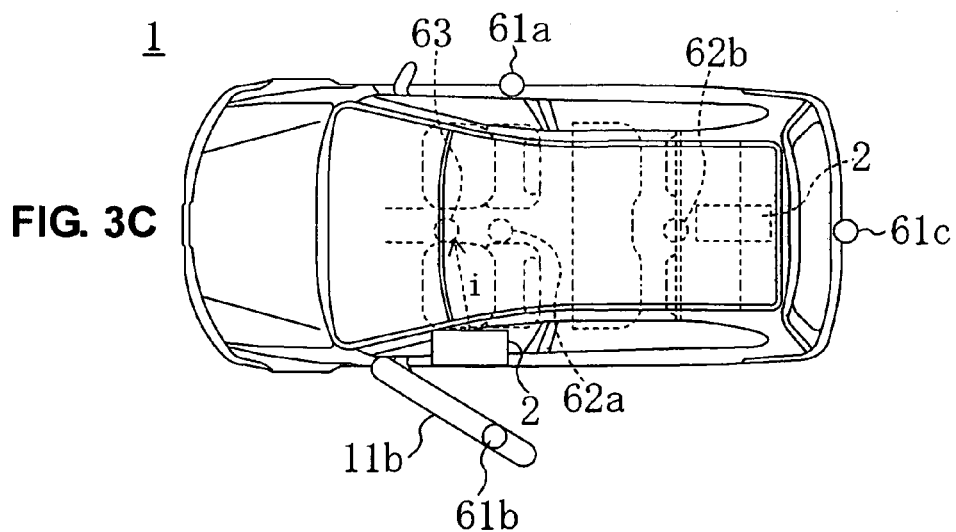
FIG. 3C is a plan view of the vehicle equipped with the onboard device in a state of disablement cancellation control.

After the above-described disablement, the vehicle-inside antenna 62 transmits the request signal r at the unlock of the doors 11a, 11b. The transmitter 2 transmits the transmitter ID signal i in response to the request signal r from the transmitting antenna 62. The onboard receiving antenna 63 receives the transmitter ID signal i, and the verification of the ID code contained in the transmitter ID signal i is conducted. Herein, when the transmitter ID signal i of the transmitter 2 (the second portable device) is transmitted in response to the request signal r from the vehicle-inside transmitting antenna 62 and the ID code verification based on the signal is confirmed, and when the ID code has not been disabled, it is determined that the transmitter 2, namely the passenger with the transmitter is present in the vehicle, as shown in FIG. 3C, and the disablement of the ID codes of the transmitter 2 and the transponder 29a corresponding to the ID code of the transmitter 2 is cancelled.

Subsequently, the engine start control will be described. This engine start control is to start the engine by tuning the ignition starter 13 to the START position. The details will be described below.

Herein, the engine start may be attained by the rotational operation of the mechanical key 29 inserted into the key slot 16. Specifically, when the mechanical key 29 is operated to the ignition START, the transponder signal j is transmitted from the transponder 29a of the mechanical key 29 and it is determined by the control unit 40 whether the ID code of the transponder 29a contained in the transponder signal j has been registered at the memory 44 or not. When it has been registered, the verification of the ID code of the transponder 29a is conducted. When the verification is confirmed, the engine is started. Meanwhile, after the disablement, the engine start is not conducted even if the verification of the ID code of the transponder 29a is confirmed when the mechanical key 29 is operated to the ignition START. The details will be described below.

<Smart Keyless (R) Control>

Figure 4:
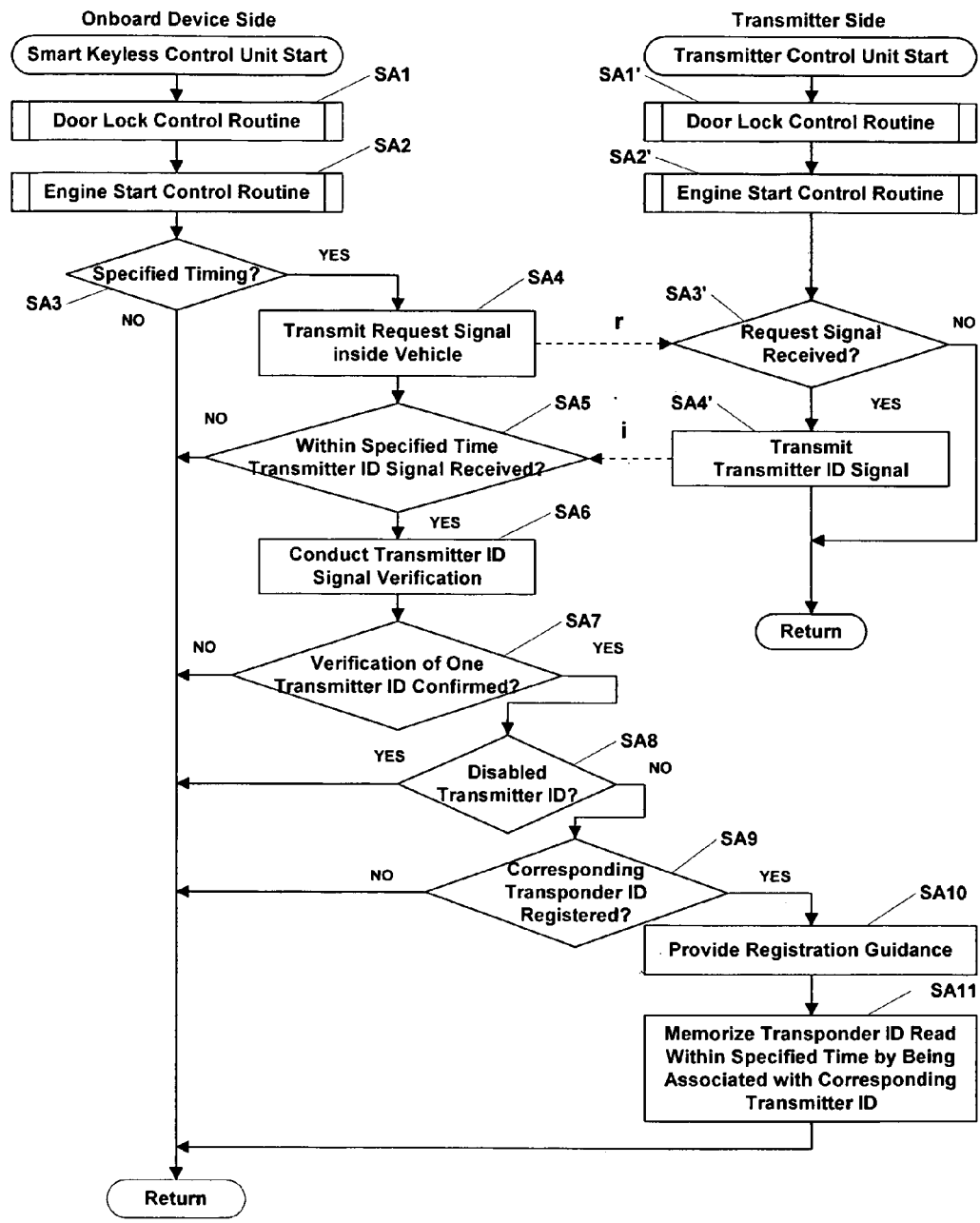
FIG. 4 is flowcharts of a smart keyless (R) control by a smart keyless control unit and a transmitter control unit.

Hereinafter, the smart keyless (R) control by the smart keyless (R) control unit 4 and the transmitter control unit 22 will be described referring to flowcharts in FIG. 4. Herein, first the control by the control unit 4 will be described referring to a flowchart on the left in the figure, and then the control by the control unit 22 will be described referring to a flowchart on the right in the figure. Broken lines show flows of the signals between the onboard device 3 and the transmitter 2 in the figure.

(1) Smart Keyless (R) Control by Smart Keyless (R) Control Unit

In step SA1 the door lock control is conducted. In step SA2 the engine start control is conducted. In step SA3 it is determined whether a specified timing comes or not. Specifically, it is determined whether or not the current timing is just after the ignition starter 13 is operated to the ignition OFF position or the ignition ON position, or just after the doors 11a, 11b are opened. When the answer to the step SA3 is YES, the control sequence proceeds to step SA4. When it is NO, the control sequence returns.

In step SA4, the vehicle-inside transmitting antennas 62a, 62b transmit the request signal r inside the vehicle. In step SA5, it is determined whether or not the onboard receiving antenna 63 receives the transmitter ID signal i from the transmitter 2 within a specified period of time after the transmission of this request signal r. Herein, when the answer to the step SA5 is YES, the control sequence proceeds to step SA6. When it is NO, the control sequence returns.

Then, the verification of the ID code contained in the transmitter ID signal i is conducted in the step SA6. In step SA7 it is determined whether only the ID code of one transmitter 2 matches the ID code of the transmitter 2 that has been registered at the memory 70 or not. When the answer to the step SA7 is YES (namely, when the verification is confirmed), it is considered that only one transmitter 2 is present in the vehicle, and thus the control sequence proceeds to step SA8. When the answer is NO (namely, when their matching is not confirmed (for example, when although the passenger has a transmitter that can transmit ID signal in response to the request signal from the onboard device, this transmitter is just for another vehicle other than this vehicle 1)) or when matching of two or more ID codes is confirmed (namely, two or more transmitters 2 are present in the vehicle), the control sequence returns without providing the guidance for registration to the meter unit 12a, which will be described below.

It is determined whether the ID code of the transmitter 2 whose verification has been confirmed has been disabled or not in the step SA8. When the answer to it is YES (disabled ID code), the control sequence returns. When it is NO (valid ID code), the control sequence proceeds to step SA9. It is determined in the step SA9 whether or not the ID code of the transponder 29a corresponding to that ID code of the transmitter 2 has been registered at the memory 70. When the answer to the step SA9 is YES (not registered), the control sequence proceeds to step SA10. When it is NO (registered), the control sequence returns. In the step SA10, a guidance for registration like "Please insert the mechanical key of the transmitter you have now into the key slot" is provided to the meter unit 12a. This guidance may be conducted with a sound (voice) guidance. Then, in step SA11 the ID code of the transponder 29a that is read within the specified period of time after the provision of guidance is memorized at the memory 70 so as to be associated with the ID code of the transmitter 2 corresponding thereto.

(2) Smart Keyless (R) Control by Transmitter Control Unit

In step SA1' the door lock control is conducted. In step SA2' the engine start control is conducted. In step SA3' it is determined whether the receiving antenna 23 receives the request signal r from the onboard device 3 or not. Herein, in the case where the transmitter 2 the passenger have is located within a signal reaching area (electric field) of the request signal r from the vehicle-inside antennas 62a, 62b, the transmitter 2 receives the request signal r with the receiving antenna 23. When the answer to the step SA3' is YES, the control sequence proceeds to step SA4'. When the answer is NO, the control sequence returns. The transmitting antenna 24 transmits the transmitter ID signal i to the onboard device 3 in the step SA4'.

<Door Lock Control>

Figure 5:
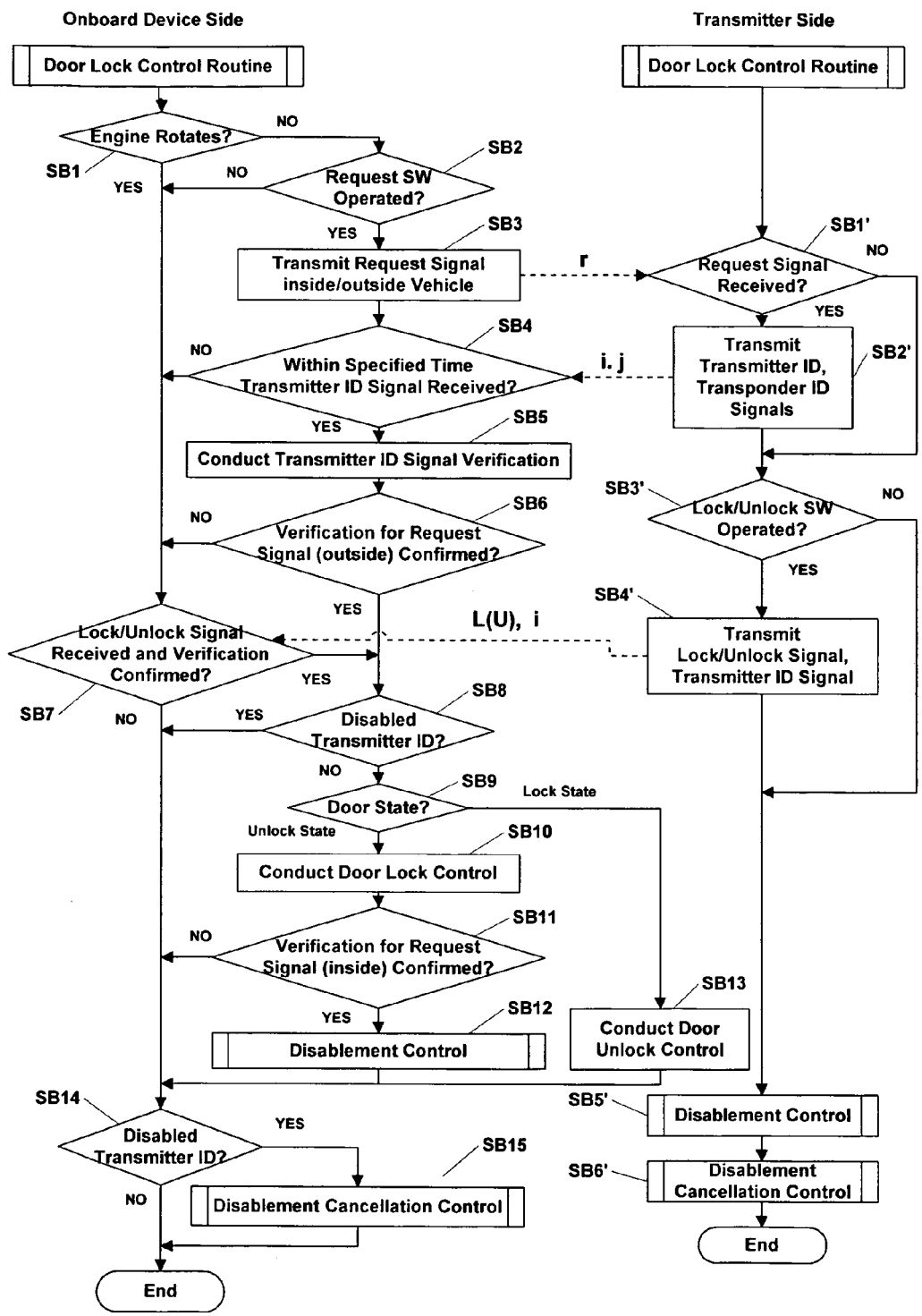
FIG. 5 is flowcharts of a door lock control by the smart keyless (R) control unit and the transmitter control unit.

Hereinafter, the door lock control by the smart keyless (R) control unit 4 and the transmitter control unit 22 will be described referring to flowcharts in FIG. 5. Herein, first the door lock control by the control unit 4 will be described referring to a flowchart on the left in the figure, and then the door lock control by the control unit 22 will be described referring to a flowchart on the right in the figure.

(1) Door Lock Control by Smart Keyless (R) Control Unit

In step SB1 it is determined based on the output signal of the engine speed detecting sensor 55 whether the engine rotates or not. Herein, it may be determined whether or not the ignition starter 13 is in the accessory ON position or the ignition ON position. When the answer to the step SB1 is YES, the control sequence proceeds to step SB7. When the answer is NO, the control sequence proceeds to step SB2. It is determined in the step SB2 whether the door request switch 50 is operated by pushing or not. When the answer to the step SB2 is YES, the control sequence proceeds to step SB3. When the answer is NO, the control sequence proceeds to the step SB7. In the step SB3, the vehicle-outside/vehicle-inside transmitting antennas 61a-61c, 62a, 62b transmit the request signal r outside and inside the vehicle.

In step SB4, it is determined whether or not the onboard receiving antenna 63 receives the transmitter ID signal i from the transmitter 2 within a specified period of time after the transmission of this request signal r. Herein, when the answer to the step SB4 is YES, the control sequence proceeds to step SB5. When it is NO, the control sequence proceeds to the step SB7. Then, the verification of the ID code contained in the transmitter ID signal i is conducted in the step SB5. In step SB6, it is determined whether or not the ID code contained in the transmitter ID signal i in response to the request signal r transmitted outside the vehicle matches the ID code of the transmitter 2 that has been registered at the memory 70. When the answer to the step SB6 is YES (namely, when the verification is confirmed), it is considered that the transmitter 2 is present outside the vehicle near the doors 11a, 11b, and thus the control sequence proceeds to step SB8. When the answer is NO (namely, when the transmitter ID signal i is not received in response to the request signal r transmitted outside the vehicle, or their matching is not confirmed), the control sequence proceeds to the step SB7.

It is determined in the step SB7 whether or not the onboard receiving antenna 63 receives the lock signal L or the unlock signal U and the transmitter ID signal i from the transmitter 2 and whether or not the ID code contained in the transmitter ID signal i matches the ID code of the transmitter 2 that has been registered at the memory 70. When the answer to the step SB7 is YES (namely, when the lock signal L or the unlock signal U and the transmitter ID signal i are received and the ID signal verification is confirmed), the control sequence proceeds to the step SB8. When the answer is NO (namely, those signals L, U, i are not received, or the ID signal verification is confirmed), the control sequence proceeds to step SB14. It is determined in the step SB8 whether the ID code of the transmitter 2 whose verification has been confirmed has been disabled or not. When the answer to it is YES (disabled ID code), the control sequence proceeds to step SB14. When it is NO (valid ID code), the control sequence proceeds to step SB9.

It is determined based on the output signal of the door lock detecting sensor 54 in the step SB9 whether the doors 11a, 11b are locket or unlocked. When they are in the unlocked state, the control sequence proceeds to the step SB10. When they are in the locked state, the control sequence proceeds to step SB13. The door lock control is conducted in the step SB10. In the step SB11 it is determined whether the ID code contained in the transmitter ID signal transmitted in response to the request signal r that is transmitted inside the vehicle matches the ID code of the transmitter 2 that has been registered at the memory 70 or not. When the answer to the step SB11 is YES (namely, when the verification is confirmed), it is considered that the transmitter 2 is left behind in the vehicle, and thus the control sequence proceeds to step SB12. When the answer is NO (namely, when that transmitter ID signal i is not received or their matching is not confirmed), the control sequence proceeds to step SB14.

The disablement control is conducted in the step SB12, and then the control sequence proceeds to step SB14.

In the step SB13, the door unlock control is conducted. Subsequently, the control sequence proceeds to the step SB14.

In the step SB14 it is determined whether or not there is the ID code of the transmitter 2 that has been disabled. When the answer to the step SB14 is YES, the control sequence proceeds to step SB15. When it is NO, the control sequence ends. The disablement cancellation control is conducted in the step SB15, and then the control sequence ends.

(2) Door Lock Control by Transmitter Control Unit

In step SB1' it is determined whether the receiving antenna 23 receives the request signal r from the onboard device 3 or not. When the answer to the step SB1' is YES, the control sequence proceeds to step SB2'. When the answer is NO, the control sequence proceeds step SB3'. The transmitting antenna 24 transmits the transmitter ID signal i and the transponder ID signal j to the onboard device 3 in the step SB2'. In the step SB3' it is determined whether or not the lock switch 26 or the unlock switch 27 is operated by pushing. When the answer to the step SB3' is YES, the control sequence proceeds to step SB4'. When the answer is NO, the control sequence proceeds step SB5'. The transmitting antenna 24 transmits the lock signal L or the unlock signal U and the transmitter ID signal i to the onboard device 3 in the step SB4'. In the step SB5' the disablement control is conducted. In the step SB6' the disablement cancellation control is conducted. Then, the control sequence ends.

<Disablement Control>

Figure 6:
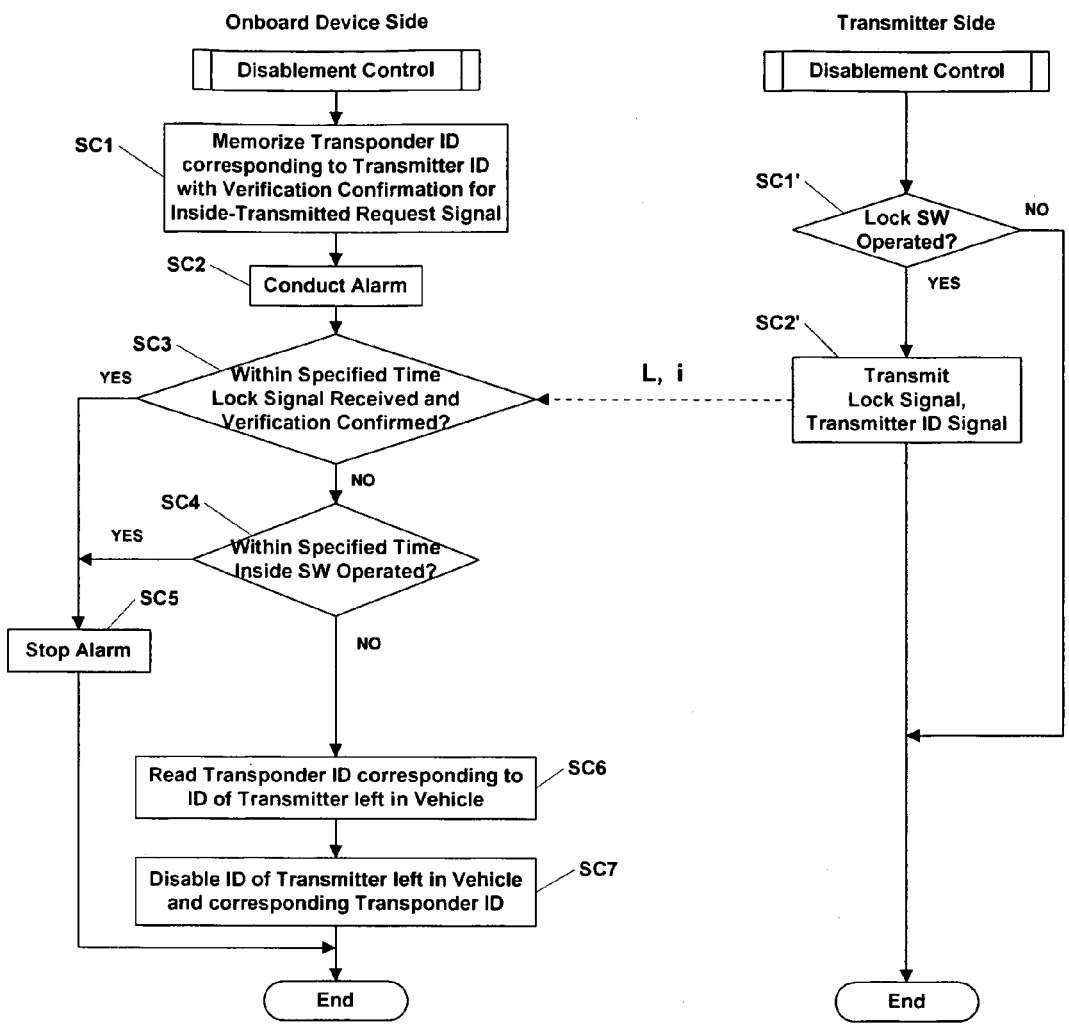
FIG. 6 is flowcharts of the disablement control by the smart keyless (R) control unit and the transmitter control unit.

Hereinafter, the disablement control by the smart keyless (R) control unit 4 and the transmitter control unit 22 will be described referring to flowcharts in FIG. 6. Herein, first the disablement control by the smart keyless (R) control unit 4 will be described referring to a flowchart on the left in the figure, and then the disablement control by the control unit 22 will be described referring to a flowchart on the right in the figure.

(1) Disablement Control by Smart Keyless (R) Control Unit

In step SC1, the ID code of the transponder 29a corresponding to the ID code of the transmitter 2 (see the step SB11 in FIG. 5), which has been considered to be left behind in the vehicle by the matching confirmation of the ID code contained in the transmitter ID signal i transmitted in response to the request signal that is transmitted inside the vehicle, is memorized so as to be associated with the ID code of the transmitter 2. Herein, this step is executed only when the ID code of the transponder 29a corresponding to the ID code of the transmitter 2 left behind in the vehicle is not registered at the memory 70. In step SC2 an alarm for preventing the transmitter 2 from being left behind mistakenly (a specified alarm) is conducted. This alarm is executed by operating the vehicle-outside buzzer 7, the vehicle-inside alarming buzzer of the meter unit 12a, and the buzzer 8 of another transmitter 2 other than the transmitter 2 left behind, and turning on the alarming lamp of the meter unit 12a. Thus, the situation of the transmitter left behind is notified by the alarm. This alarm may be stopped after a specified time has passed.

It is determined in the step SC3 whether or not, within a specified period of time after the above-described alarm, the onboard receiving antenna 63 receives the lock signal L and the transmitter ID signal i from the vehicle-side or vehicle-outside transmitter 2 and the ID code contained in the transmitter ID signal i matches the ID code of the transmitter 2 that has been registered at the memory 70. When the answer to the step SC3 is YES (namely, when the lock signal L and the transmitter ID signal i are received and their ID verification is confirmed), the control sequence proceeds to step SC5. When the answer is NO (namely, when the lock signal L and the transmitter ID signal i are not received or their ID matching is not confirmed), the control sequence proceeds to step SC4. It is determined in the step SC4 whether or not the vehicle-inside switches 15 are operated within the specified period of time after the alarm. When the answer to the step SC4 is YES (namely, they are operated), the control sequence proceeds to the step SC5. When the answer is NO (namely, they are not operated), the control sequence proceeds to step SC6.

In the step SC5, the alarm is stopped and the ID code of the transmitter 2 in the vehicle and the ID code of the transponder 29a corresponding to the ID code of the transmitter 2 are not disabled. Then, the control sequence ends.

In the step SC6, the ID code of the transponder 29a corresponding to the ID code of the transmitter 2 left behind in the vehicle is read. In subsequent step SC7, the ID code of the transmitter 2 left behind in the vehicle and the ID code of the transponder 29a corresponding to the ID code of the transmitter 2 are disabled. Then, the control sequence ends.

(2) Disablement Control by Transmitter Control Unit

In step SC1' it is determined whether or not the lock switch 26 of the transmitter 2 that is located inside or outside the vehicle is operated by pushing. When the answer to the step SC1' is YES (namely, it is operated), the control sequence proceeds to step SC2'. When the answer is NO (namely, it is not operated), the control sequence ends. The transmitting antenna 24 transmits the lock signal L and the transmitter ID signal i to the onboard device 3 in the step SC2'. Then, the control sequence ends.

<Disablement Cancellation Control>

Hereinafter, the disablement cancellation control by the smart keyless (R) control unit 4 and the transmitter control unit 22 will be described referring to flowcharts in FIG. 7. Herein, first the disablement cancellation control by the smart keyless (R) control unit 4 will be described referring to a flowchart on the left in the figure, and then the disablement cancellation control by the control unit 22 will be described referring to a flowchart on the right in the figure.

(1) Disablement Cancellation Control by Smart Keyless (R) Control Unit

In step SD1 it is determined whether or not the doors 11a, 11b are unlocked by the pushing operation of the door request switch 50 or the unlock switch 27 of the transmitter 2, or inserting and turning the mechanical key 29 in the door key cylinder 51. Herein, it may be determined whether or not the doors 11a, 11b are opened or whether or not the doors 11a, 11b are unlocked and they are also opened. When the answer to the step SD1 is YES, the control sequence proceeds to step SD3. When the answer is NO, the control sequence proceeds to step SD2. It is determined in the step SD2 whether it is now within a specified period of time (e.g., 2 seconds) after the doors 11a, 11b are in the closed state. When the answer to the step SD2 is YES, the control sequence proceeds to step SD3. When the answer is NO, the control sequence ends.

In the step SD3, the vehicle-inside transmitting antennas 62a, 62b transmit the request signal r inside the vehicle. This signal transmission is conducted periodically until the engine start control. In step SD4, it is determined whether or not the onboard receiving antenna 63 receives the transmitter ID signal i from the transmitter 2 within a specified period of time after the transmission of this request signal r. Herein, when the answer to the step SD4 is YES, the control sequence proceeds to step SD5. When it is NO, the control sequence ends. Then, the verification of the ID code contained in the transmitter ID signal i is conducted in the step SD5. In step SD6, it is determined whether or not the ID code of the transmitter 2 matches the ID code of the transmitter 2 that has been registered at the memory 70 and whether or not that ID code has not disabled. When the answer to the step SD6 is YES (namely, when the verification is confirmed and that is a valid ID code), it is considered that the transmitter 2 whose ID code has not disabled, namely the passenger carrying that transmitter 2, is present inside the vehicle, and thus the control sequence proceeds to step SD7. When the answer is NO (namely, when their matching is not confirmed, or that is an disabled ID), the control sequence ends.

In the step SD7, the disablement of the ID code of the transmitter 2, whose verification has been confirmed (namely, the ID code of the transmitter 2 present in the vehicle), that has been disabled and the ID code of the transponder 29a corresponding to this ID code of the transmitter 2 are cancelled. In step SD8, an alarm for the disablement cancellation is conducted. This alarm is executed by operating the vehicle-outside buzzer 7, the vehicle-inside alarming buzzer of the meter unit 12a, and turning on the alarming lamp of the meter unit 12a. Thus, the situation of this cancellation is notified by the alarm to the passenger who is in the vehicle or outside. In step SD9 the alarm signal transmitting antenna (not illustrated) transmits an alarm signal a.

(2) Disablement Cancellation Control by Transmitter Control Unit

In step SD1' it is determined whether the receiving antenna 23 receives the request signal r from the onboard device 3 or not. When the answer to the step SD1' is YES, the control sequence proceeds to step SD2'. When the answer is NO, the control sequence proceeds step SD3'. The transmitting antenna 24 transmits the transmitter ID signal i and the transponder ID signal j to the onboard device 3 in the step SD2'. In the step SD3' it is determined whether the receiving antenna 23 receives the alarm signal from the onboard device 3 or not. When the answer to the step SD3' is YES, the control sequence proceeds to step SD4'. When the answer is NO, the control sequence ends. In the step SD4', an alarm for the disablement cancellation is conducted. This alarm is executed by operating the buzzer 28 of the transmitter 2. Thus, the situation of this cancellation is notified by the alarm to the passenger who carries the transmitter 2. Then, the control sequence ends.

<Engine Start Control>

Figure 8:
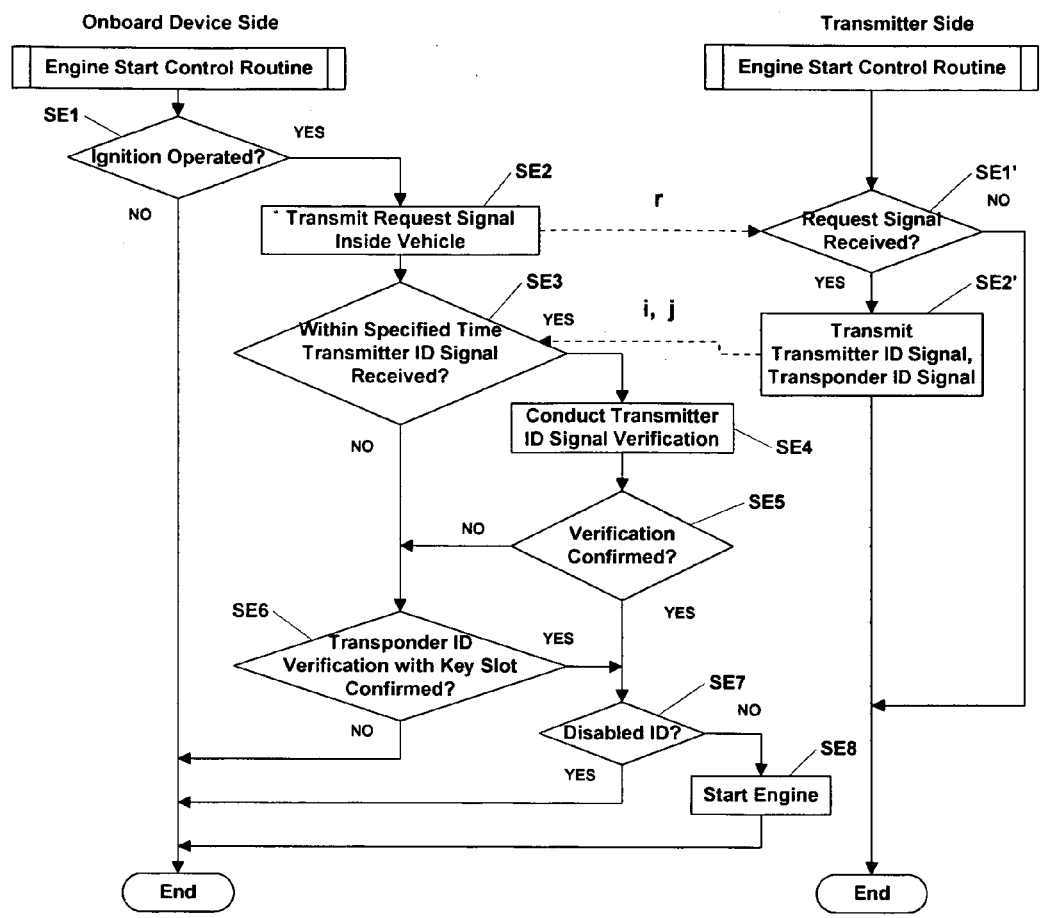
FIG. 8 is flowcharts of an engine start control by the smart keyless (R) control unit and the transmitter control unit.

Hereinafter, the engine start control by the smart keyless (R) control unit 4 and the transmitter control unit 22 will be described referring to flowcharts in FIG. 8. Herein, first the control by the control unit 4 will be described referring to a flowchart on the left in the figure, and then the control by the control unit 22 will be described referring to a flowchart on the right in the figure.

(1) Engine Start Control by Smart Keyless (R) Control Unit

In step SE1 it is determined whether the ignition starter 13 is rotated to the ignition START position or not. When the answer to the step SE1 is YES, the control sequence proceeds to step SE2. When it is NO, the control sequence ends. In step SE2, the vehicle-inside transmitting antennas 62a, 62b transmit the request signal r inside the vehicle. In step SE3, it is determined whether or not the onboard receiving antenna 63 receives the transmitter ID signal i from the transmitter 2 within a specified period of time after the transmission of this request signal r. Herein, when the answer to the step SE3 is YES, the control sequence proceeds to step SE4. When it is NO, the control sequence proceeds to SE6. Then, the verification of the ID code contained in the transmitter ID signal i is conducted in the step SE4. In step SE5 it is determined whether or not the ID code contained in the transmitter ID signal i matches the ID code of the transmitter 2 that has been registered at the memory 70. When the answer to the step SE5 is YES (namely, when the verification is confirmed), the control sequence proceeds to step SE7. When the answer is NO (namely, when their matching is not confirmed), the control sequence proceeds to step SE6.

In the step SE6 it is determined whether or not the ID code contained in the transponder ID signal j from the transponder 29a of the mechanical key 29 inserted into the key slot 16 matches the ID code of the transponder 29a that has been registered at the memory 70. When the answer to the step SE6 is YES (namely, when the verification is confirmed), the control sequence proceeds to the step SE7. When the answer is NO (namely, when their matching is not confirmed), the control sequence ends. In the step SE7, it is determined whether the ID code of the transmitter 2 or the ID code of the transponder 29a whose verification has been confirmed has been disabled or not. When the answer to it is YES (disabled ID code), the control sequence ends. When it is NO (valid ID code), the control sequence proceeds to step SE8. In the step SE8, an engine start grant signal is supplied to the ECU 8, and thereby a motor is driven to start the engine, so the ignition starter control is executed. Then, the control sequence ends.

Herein, the verification of the ID code of the transmitter 2 may be done in advance by conducting the steps SE2-SE5 when a certain requirement is met. This requirement is such that at least one of (i) the ignition starter 13 is rotated from the accessory OFF position to the accessory ON position, (ii) any of the doors 11a, 11b is opened from the all-door-closed state, and (iii) all the doors 11a, 11b are closed from the any-door-opened state is met. Namely, in any of these situations, there is a high likelihood of the ignition starter 13 being operated to the START position. In this case, when the ID code verification has been confirmed, the steps SE2-SE6 are omitted. As a result, by operating the ignition starter 13 to the START position, the ignition starter control to start the engine can be conducted soon without spending any time for the ID code verification.

(2) Engine Start Control by Transmitter Control Unit

In step SE1' it is determined whether the receiving antenna 23 receives the request signal r from the onboard device 3 or not. When the answer to the step SE1' is YES, the control sequence proceeds to step SE2'. When the answer is NO, the control sequence ends. The transmitting antenna 24 transmits the transmitter ID signal i and the transponder ID signal j to the onboard device 3 in the step SE2'. Then, the control sequence ends.

According to the above-described embodiment, even if there is the ID verification confirmation of the ID signal i that is transmitted from the transmitter 2 in response to the request signal r transmitted inside the vehicle at the lock of the doors 11a, 11b, the smart keyless (R) control unit 4 prohibits the disablement of the ID verification with the transmitter 2 at the operation of the ignition starter 13 when it is determined that the passenger is present in the vehicle. Namely, when it is determined that the passenger is present in the vehicle, even if the transmitter 2 is located in the vehicle (for example, when the transmitter 2 is left behind in the vehicle, or when the passenger remaining in the vehicle has the transmitter 2), the ID verification with the transmitter 2 located in the vehicle is not disabled. Accordingly, the passenger remaining in the vehicle can operate the engine start with the transmitter 2. Thereby, the proper utility or facility of the smart entry (R) system for a vehicle can be obtained.

Herein, the above-described "the specified operation" means the operations of at least one of the vehicle-inside switches 15, the transmitter 2 located in the vehicle, and the transmitter 2 located outside the vehicle. Namely, when it is determined that the switches 15 or the transmitter 2, which are located in the vehicle, are operated by the passenger remaining in the vehicle, or when the transmitter 2 located outside the vehicle is operated by the passenger located outside the vehicle, the ID verification with the transmitter 2 located in the vehicle is not disabled even if the transmitter 2 is present in the vehicle. Accordingly, the ID verification with the transmitter 2 located in the vehicle is not disabled at need when the above-described operations are conducted by the passenger. Thus, since the disablement of the ID verification with the transmitter 2 located in the vehicle is restricted properly, it can be prevented that any unauthorized person (thief) starts the engine with the transmitter 2 located in the vehicle and steel the vehicle. Thereby, the proper utility or facility of the smart entry (R) system for a vehicle can be obtained.

Also, when the ID verification of the ID signal from the transmitter 2 is confirmed, the smart entry (R) system conducts the alarm that notifies the transmitter 2 present in the vehicle. Thereby, the passenger can know that the transmitter 2 is left behind in the vehicle.

In case the ID verification with the transmitter 2 located in the vehicle was not disabled all the time even if the transmitter 2 was present in the vehicle, any unauthorized person (thief) might get in the vehicle and start the engine, steal the vehicle.

According to the present embodiment, the smart keyless (R) control unit 4 does not disable the ID verification with the transmitter 2, namely, prohibits the disablement of the ID verification, when it is determined that the specified operation is conducted by the passenger, showing the presence of the passenger in the vehicle, within the specified period of time after the above-described alarm. Namely, when it is determined within the specified period of time after the alarm that the switches 15 or the transmitter 2, which are located in the vehicle, is operated by the passenger remaining in the vehicle, or when the transmitter 2 located outside the vehicle is operated by the passenger located outside the vehicle, the ID verification with the transmitter 2 located in the vehicle is not disabled (namely, the disablement is prohibited). Thus, since the ID verification with the transmitter 2 is not disabled when it is determined that the above-described specified operation is conducted within the specified period of time after the alarm, the disablement of the ID verification with the transmitter 2 located in the vehicle can be restricted more properly, so it can be prevented more properly that any unauthorized person (thief) starts the engine with the transmitter 2 located in the vehicle and steel the vehicle. Thereby, the proper utility or facility of the smart entry (R) system for a vehicle can be improved.

Also, according to present embodiment, the disablement of the ID verification with the transmitter 2 left behind in the vehicle is cancelled by the smart keyless control unit 4 when there is the confirmation of the ID verification, in which the ID verification is conducted based on the ID signal i that is transmitted by another transmitter 2 other than the transmitter 2 left behind in response to the request signal r that has been transmitted inside the vehicle after the doors 11*a*, 11*b* are unlocked. Namely, when this ID verification is confirmed, it is considered that the transmitter 2, namely, the passenger carrying this transmitter 2 is present in the vehicle, and thus the disablement of the ID verification with the transmitter 2 left behind is cancelled. Accordingly, any unauthorized person (thief) can be prevented from getting in the vehicle 1 as soon as the doors 11*a*, 11*b* are locked, and from starting the vehicle by using the transmitter 2 left behind in the vehicle to steel the vehicle. Thereby, the security of the smart entry system can be improved.

Further, when there is the confirmation of the ID verification of the ID signal i that is transmitted by the another transmitter 2 other than the transmitter 2 left behind in response to the request signal r that has been transmitted inside the vehicle after the doors 11*a*, 11*b* are unlocked, the disablement of the ID verification with the transmitter 2 left behind in the vehicle is cancelled by the smart keyless control unit 4 and this cancellation of the ID verification disablement is notified to the passenger. Thereby, since the passenger can recognize the cancellation of the disablement of the ID verification with the transmitter 2 left behind in the vehicle, the situation where the passenger would leave the vehicle 1 with the transmitter 2 left behind in the vehicle without the door lock of the doors 11*a*, 11*b* can be properly prevented. Accordingly, any unauthorized person (thief) can be prevented from getting in the vehicle 1 and starting the vehicle by using the transmitter 2 left behind in the vehicle to steel the vehicle. Thereby, the security of the smart entry system can be further improved.

Herein, the above-described request signal r for the ID verification is periodically transmitted inside the vehicle by the smart keyless control unit 4 prior to the engine start after the doors 11*a*, 11*b* are unlocked. Thereby, since the passenger can know the above-described cancellation of the disablement of the ID verification with the transmitter 2 left behind prior the engine start. Generally, after the engine has started, the passenger (driver) would have relatively busy time and some noises (engine noise) would distract the passenger' attention. According to the above-described embodiment, however, since the notification of the cancellation of the disablement of the ID verification is conducted to the passenger prior the engine start, the passenger can surely recognize the situation of the cancellation surely and deal with it properly with time on hand. Thus, the utility or facility of the smart entry system can be improved.

Figure 7:
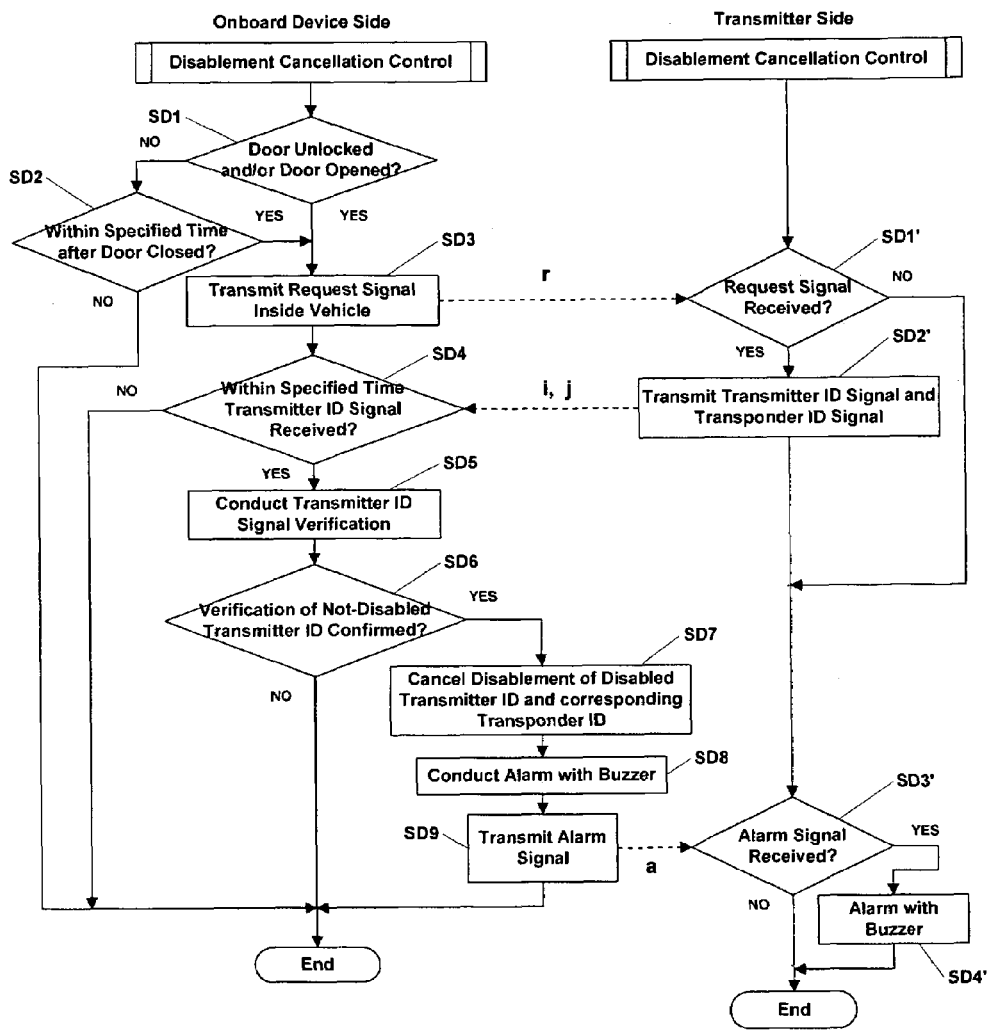
FIG. 7 is flowcharts of the disablement cancellation control by the smart keyless (R) control unit and the transmitter control unit.

Also, even in the case where there is the confirmation of the ID verification of the ID signal i that is transmitted by the another transmitter 2 other than the transmitter 2 left behind in response to the request signal r that has been transmitted inside the vehicle after the doors 11*a*, 11*b* are unlocked, when the transmitter 2 is not located in the vehicle, the disablement of the ID verification with the transmitter 2 that is not located in the vehicle is not cancelled (see step SD7 in FIG. 7). Thus, even if the passenger carrying another transmitter 2 other than the transmitter 2 that has been left behind in the vehicle is present in the vehicle, when the transmitter left behind is taken out of the vehicle, the disablement of the ID verification with the transmitter 2 is not cancelled. Thereby, the situation, where any person other than the vehicle's user could take the transmitter 2 left behind out of the vehicle once and then again get in the vehicle with the transmitter 2 and steal the vehicle using the portable device carried into the vehicle (after the disablement of the ID verification has been cancelled), can be avoided. Thus, the security of the smart entry system can be further improved.

Further, according to the present embodiment, the ID verification with the transmitter 2 is disabled when the confirmation of the ID verification is accomplished, namely, when it is determined that the ID of the ID signal transmitted by the transmitter 2 matches the ID of the transmitter 2 that is memorized at the memory 70, and the ID verification with the transponder 29*a* at operation of the engine start by the mechanical key 29 is also disabled when the ID verification is confirmed. Thereby, any person (thief) other than the vehicle' user who gets in the vehicle can not start the engine by using the transmitter 2 or the mechanical key 29, so the vehicle can not be stolen. Thus, the security of the smart entry system can be improved.

Generally, the transponder 29*a* is not operated by a battery, which is different from the transmitter 2, and therefore it may not have a problem of the battery becoming dead. Also, the transponder 29*a* is configured to transmit its own ID that is particular to it when it is inserted into the key slot 16. Accordingly, the key slot 16 can receive the ID of the transponder 29*a* only when the transponder 29*a* is located very close to the key slot 16 (for example, within 15 cm). Herein, in case the transmitter 2 with the transponder 29*a* is left behind in the vehicle, the transmitter 2 may not be located very close to the key slot 16, so the ID verification with the transponder 29*a* can not be disabled by the key slot 16. Therefore, the inventors of the present invention has devised an idea according to the above-described embodiment.

Also, the transmitter 2 transmits the ID of the transponder 29*a* that is read by the transponder reader 25 along with its ID signal at least when receiving the request signal r at the door lock of the doors 11*a*, 11*b*. Then, the onboard receiving antenna 63 receives the ID of the transponder 29*a* along with the ID signal from the transmitter 2. The received ID of the transponder 29*a* is memorized at the memory 70 in such a manner that it is associated with the ID of the transmitter 2. Thus, even in case the ID of the transponder 29*a* that is associated with the ID of the transmitter 2 has not been memorized at the memory 70, the ID of the transponder 29*a* corresponding to the ID of the transmitter 2 can be easily memorized at the memory 70 by memorizing the ID of the transponder 29*a* from the transmitter 2 that is received by the onboard receiving antenna 63.

Also, when the ID of the transponder 29*a* corresponding to the ID of the transmitter 2 is not memorized at the memory 70 in case the transmitter 2 is present in the vehicle, the guidance for prompting the passenger to make the key slot 16 read the ID of the transponder 29*a* is provided. And, the memory 70 memorizes the ID of the transponder 29*a* that is read by the key slot 16 after the guidance in such a manner that both ID are associated with each other. Thus, even in case the ID of the transponder 29*a* that is associated with the ID of the transmitter 2 has not been memorized at the memory 70, the ID of the transponder 29*a* corresponding to the ID of the transmitter 2 can be easily memorized at the memory 70, by making the key slot 16 read the ID of the transponder 29*a* with the guidance and memorizing the ID of the transponder 29*a* from the transmitter 2 that is received by the key slot 16.

In case the ID of the transponder 29*a* corresponding to the ID of the transmitter 2 is not memorized at the memory 70 with a plurality of transmitters 2, . . . including the transmitter 2 present in the vehicle, it is not apparent which transmitter has no ID of the transponder 29*a* memorized at the memory 70. In this case, providing the guidance might cause a problem that the passenger makes the key slot 16 read the ID of the wrong transponder 29*a*. As a consequence, the ID of the wrong transponder 29*a* might be memorized at the memory 70.

Herein, according to the above-described embodiment, the guidance is not provided when a plurality of transmitters 2, . . . including the transmitter 2 are present in the vehicle even if the ID of the transponder 29*a* corresponding to the ID of the transmitter 2 is not memorized at the memory 70. Thereby, the situation where the ID of the wrong transponder 29*a* might be memorized at the memory 70 can be avoided properly.

Although the door request switches 50 are provided to operate the door unlock from outside the vehicle in the above-described embodiment, for example, there may be provided a capacitance detecting sensor instead which are provided at the door knobs of the doors 11*a*, 11*b* and can detect the door unlock operation by an operator from outside the vehicle by detecting part of the door unlock operator (for example, a hand) approaching the door knob.

Also, although the ignition starter 13 is provided as an ignition start switch in the above-described embodiment, for example, there may be provided any other button to start the engine.

Further, although it is conducted by not starting the engine despite the ID verification confirmation in the above-described embodiment, for example, the disablement of ID code of the transmitter 2 at the operation of the ignition starter 13 may be conducted by disabling the ID code, disabling the transmitter 2, or missing conducting the ID code verification.

Likewise, although it is conducted by not starting the engine despite the ID verification confirmation in the above-described embodiment, for example, the disablement of ID code of the transponder 29*a* at the operation of the mechanical key 29 to the ignition START position may be conducted by disabling the ID code, disabling the transponder 29*a*, or not conducting the ID code verification.

Also, although the vehicle-outside transmitting antenna 61 is comprised of three antennas 61*a*-61*c* and the vehicle-inside transmitting antenna 62 is comprised of two antennas 62*a*, 62*b* in the above-described embodiment, for example, the vehicle-outside transmitting antenna 61 is comprised of one, two or four or more antennas and the vehicle-inside transmitting antenna 62 is comprised of one or three or more antennas.

Further, although the vehicle-outside transmitting antenna 61 is configured to transmit the signal only outside the vehicle in the above-described embodiment, the antennas 61*a*, 61*b* provided at sides of the driver's seat and the assistant's seat may be configured to transmit the signals both outside and inside the vehicle. In this case, when the onboard receiving antenna 63 receives the transmitter ID signal i that is transmitter 2 in response to only the request signal r of the vehicle-outside transmitting antenna 61, it is considered that the transmitter 2 is located outside the vehicle near the driver's-seat-side door 11*a*, the assistant's-seat-side door 11*b*, or the rear end panel 11*c*. Meanwhile, when the onboard receiving antenna 63 receives the transmitter ID signal i that is transmitter 2 in response to both the request signals r of the vehicle-outside and vehicle-inside transmitting antennas 61, 62, it is considered that the transmitter 2 is located inside the vehicle.

Also, although the alarm for the transmitter 2 left behind is conducted so as to notify the passengers inside and outside the vehicle by operating the vehicle-outside buzzer 7, the vehicle-inside buzzer at the meter unit 12*a*, and the buzzer 28 of the transmitter 2 and by turning on the alarm lamp of the meter unit 12*a* in the above-described embodiment, this alarm may be conducted so as to notify the passenger who is located either inside or outside the vehicle.

Further, although even if there is the ID verification confirmation of the ID signal i that is transmitted from the transmitter 2 in response to the request signal r of the vehicle-inside transmitting antenna 62 at the lock of the doors 11*a*, 11*b*, the disablement of the ID codes of the transmitter 2 inside the vehicle and the corresponding the transponder 29*a* is prohibited when at least one of operations of the lock switch 26 of the transmitter 2 that is located outside or inside the vehicle and the vehicle-inside switches 15 is detected in the above-described embodiment, the above-described disablement may be also prohibited when a detecting signal is detected from a passenger-sitting sensor or a supersonic sensor, which can detect the passenger located inside the vehicle.

Also, although when the receiving antenna 23 receives the request signal r from the onboard device 3, the transmitter control unit 22 makes the transmitting antenna 24 transmit the transmitter ID signal i and transponder ID signal j in the above-described embodiment, the transmitter control unit 22 should be configured to make the transmitting antenna 24 transmit the transmitter ID signal i and transponder ID signal j at least when the receiving antenna 23 receives the request signal r from the onboard device 3 at the lock of the doors 11*a*, 11*b*.

Also, although the mechanical key 29, into which the transponder 29*a* is installed, is detachably provided at the transmitter 2 in the above-described embodiment, the transponder 29*a* and the mechanical key 29 may be provided fixedly at the transmitter 2.

The present invention should not be limited to the above-described embodiments, and any other modification and improvements may be applied within the scope of a sprit of the present invention.

What is claimed is:

1. A smart entry system for a vehicle, comprising:
    an onboard transmitter operative to transmit a request signal;
    a portable device operative to transmit an ID signal when receiving the request signal from the onboard transmitter;
    an onboard receiver operative to receive the ID signal from the portable device;
    a door control device operative to unlock a door when ID verification is confirmed, the ID verification being conducted based on the ID signal received by the onboard receiver that is transmitted by the portable device in response to the request signal that is transmitted outside the vehicle by the onboard transmitter at least when an unlock operation of the door from outside the vehicle is detected;
    an engine control device operative to start an engine of the vehicle when ID verification is confirmed, the ID verification being conducted based on the ID signal received by the onboard receiver that is transmitted by the portable device in response to the request signal that is transmitted inside the vehicle by the onboard transmitter when an engine start switch is operated; and a disablement control device operative to disable said ID verification with the portable device at the operation of the engine start switch when ID verification is confirmed, the ID verification being conducted based on the ID signal received by the onboard receiver that is transmitted by the portable device in response to the request signal that is transmitted inside the vehicle by the onboard transmitter when the door is locked, wherein said disablement control device is configured to prohibit or cancel said disablement of the ID verification with the portable device in a specified state.

2. The smart entry system for a vehicle of claim 1, wherein said disablement control device is configured to prohibit the disablement of the ID verification with the portable device in the specified state.

3. The smart entry system for a vehicle of claim 2, wherein the disablement control device prohibits the disablement of the ID verification with the portable device when it is determined that a passenger is present in the vehicle.

4. The smart entry system for a vehicle of claim 3, wherein the disablement control device prohibits the disablement of the ID verification with the portable device when it is determined that a specified operation to show that the passenger is present in the vehicle is conducted.

5. The smart entry system for a vehicle of claim 4, wherein said specified operation comprises at least one of operations of a specified switch located in the vehicle, the portable device located in the vehicle, and the portable device located outside the vehicle.

6. The smart entry system for a vehicle of claim 5, wherein said disablement control device is configured to further conduct an alarm when said ID verification is confirmed and to prohibit said disablement of the ID verification with the portable device when it is determined that said specified operation is conducted within a specified period of time after the alarm.

7. The smart entry system for a vehicle of claim 1, wherein said disablement control device is configured to cancel the disablement of the ID verification with the portable device in the specified state.

8. The smart entry system for a vehicle of claim 7, wherein the disablement control device cancels the disablement of the ID verification with said portable device when ID verification is confirmed, the ID verification being conducted based on an ID signal received by the onboard receiver that is transmitted by a portable device other than said portable device in response to the request signal that is transmitted inside the vehicle by the onboard transmitter after the door is unlocked.

9. The smart entry system for a vehicle of claim 8, wherein said disablement control device is configured to notify a passenger of said cancellation of the disablement of the ID verification.

10. The smart entry system for a vehicle of claim 9, wherein said request signal for the ID verification is periodically transmitted inside the vehicle by the onboard transmitter prior to the engine start after the door is unlocked.

11. The smart entry system for a vehicle of claim 8, wherein the disablement control device is configured such that when said portable device is not located in the vehicle, the disablement of the ID verification with the portable device that is not located in the vehicle is not cancelled.

12. The smart entry system for a vehicle of claim 3 or 8, further comprising a transponder and a key that are provided at said portable device, an onboard reading device operative to read ID of the transponder, and a memory device operative to memorize ID of said portable device and ID of said transponder, wherein said confirmation of the ID verification at said door control device to unlock the door is accomplished when it is determined that ID of the ID signal transmitted by the portable device matches the ID of said portable device that is memorized at said memory device, said confirmation of the ID verification at said engine control device to start the engine is accomplished when it is determined that the ID of the ID signal transmitted by the portable device matches the ID of said portable device that is memorized at said memory device or when it is determined that the ID of the transponder that is read by said onboard reading device matches the ID of the transponder that is memorized at said memory device, said confirmation of the ID verification at said disablement control device to disable the ID verification with the portable device is accomplished when it is determined that the ID of the ID signal transmitted by the portable device matches the ID of said portable device that is memorized at said memory device, said memory device is configured to memorize the ID of the portable device and the ID of the transponder in such a manner that both ID are associated with each other, and said disablement control device is configured to disable said ID verification with the transponder at an operation of the engine start by said key when ID verification is confirmed.

13. The smart entry system for a vehicle of claim 12, wherein said portable device comprises a portable-device-side reading device operative to read the ID of the transponder and to transmit the ID of the transponder that is read by the portable-device-side reading device at least when receiving the request signal at the door lock along with said ID signal, said onboard receiver is configured to receive the ID of the transponder along with said ID signal, and said disablement control device is configured to make said memory device memorize the ID of the transponder that is received by the onboard receiver and the ID of said portable device in such a manner that both ID are associated with each other.

14. The smart entry system for a vehicle of claim 12, wherein said disablement control device is configured to provide guidance for prompting a passenger to make the onboard reading device read the ID of the transponder when the ID of the transponder corresponding to the ID of said portable device is not memorized at the memory device in case said portable device is present in the vehicle, and to make the memory device memorize the ID of the transponder that is read by the onboard reading device after the guidance in such a manner that both ID are associated with each other.

15. The smart entry system for a vehicle of claim 14, wherein said disablement control device is configured such that said guidance is not provided when a plurality of portable devices including said portable device are present in the vehicle.

* * * * *